United States Patent
Rege

(10) Patent No.: US 6,219,342 B1
(45) Date of Patent: Apr. 17, 2001

(54) NON-ADAPTIVE SYMBOL ERROR COUNT BASED ALGORITHM FOR CDMA REVERSE LINK OUTER LOOP POWER CONTROL

(75) Inventor: Kiran M. Rege, Marlboro, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/052,581

(22) Filed: Mar. 31, 1998

(51) Int. Cl.[7] ................................................. H04B 7/185
(52) U.S. Cl. ..................... 370/318; 370/320; 370/342; 455/13.4; 455/38.3
(58) Field of Search ........................ 370/318, 479, 370/320, 342; 455/13.4, 38.3

(56) References Cited

U.S. PATENT DOCUMENTS

| 5,257,283 | * | 10/1993 | Gilhousen et al. | 375/1 |
| 5,267,262 | * | 11/1993 | Wheatly | 375/1 |
| 5,621,723 | * | 4/1997 | Walton, Jr. et al. | 370/335 |
| 5,946,346 | * | 8/1999 | Ahmed et al. | 375/219 |
| 6,069,883 | * | 5/2000 | Ejzak et al. | 370/335 |

* cited by examiner

Primary Examiner—Hassan Kizou
Assistant Examiner—Thien Tran
(74) Attorney, Agent, or Firm—Joseph J. Opalach

(57) ABSTRACT

In a cellular system based on industry standard IS-95 CDMA (code division multiple access), a symbol error count based reverse link outer loop power control technique uses non-adaptive SER targets. In particular, a base station set a fixed target for a $2^{nd}$ order statistic, e.g., standard deviation (variance), of the symbol error count as a function of a target frame error rate (FER). The base station monitors a symbol error count of a received signal (transmitted from a mobile station). This symbol error count is used to update an estimate of the standard deviation of the symbol error count. This estimate of the standard deviation of the symbol error count is compared with a target standard deviation of the symbol error count to make changes in the $E_{bT}/N_{0T}$ target. The adjusted $E_{bT}/N_{0T}$ target is used to provide power control.

20 Claims, 4 Drawing Sheets

NON-ADAPTIVE SYMBOL ERROR COUNT BASED ALGORITHM FOR CDMA REVERSE LINK OUTER LOOP POWER CONTROL

CROSS-REFERENCE TO RELATED APPLICATIONS

Related subject matter is disclosed in the co-pending, commonly assigned, U.S. patent application of Rege et al., application Ser. No. 09/514,608 filed on Feb. 28, 2000, which is a continuation-in-part of application Ser. No. 09/052,696 filed Mar. 31, 1998.

FIELD OF THE INVENTION

This invention relates generally to communications and, more particularly, to wireless systems.

BACKGROUND OF THE INVENTION

It is well known that power control is critical for CDMA (code division multiple access) wireless systems such as those based on the IS-95 standard (e.g., see Holtzman, J. M., "CDMA Power Control for Wireless Networks," in *Third Generation Wireless Information Networks*, S. Nanda and D. J. Goodman (eds), Kluwer Academic Publishers, Boston, Mass., 1992; and TIA/EIA/IS-95 Interim Standard, *Mobile Station-Base Station Compatibility Standard for Dual-Mode Wideband Spread Spectrum Cellular System*, Telecommunication Industry Association, July 1993). The ultimate objective of power control in CDMA systems is to achieve a desired speech quality on a particular link at a minimum transmit power level. Without effective power control, the capacity gains expected from a CDMA wireless system will not be realized. This is especially true for the reverse link (uplink) of a CDMA system (i.e., from a mobile station to a base station). Unless the transmit power of the mobile station is tightly controlled, the reverse link will not be able to operate at or near its potential capacity in a cellular communications environment (e.g., fading, etc.).

Realizing the importance of power control for the reverse link, the IS-95 standard has provided for a power control scheme known in the art as "inner loop power control." In this scheme, a base-station transmits a 1-bit feedback signal to a mobile station every 1.25 milliseconds (ms). The 1-bit value of this feedback signal is representative of whether an estimate of the instantaneous signal-to-noise ratio ($E/N_0$) of the received signal at the base station (transmitted from the mobile station) exceeds, or falls below, a target signal-to-noise ratio $E_{bT}/N_{0T}$. Correspondingly, when the mobile station receives this feedback signal, the mobile station raises its transmit power by 1 dB or lowers it by 1 dB depending on the value of the feedback bit. Thus, the inner loop power control scheme provided by the IS-95 standard helps maintain the signal-to-noise ratio of the received signal at the base-station close to the target $E_{bT}/N_{0T}$.

As noted above, the ultimate objective of a power control scheme in the context of CDMA systems is to achieve a desired speech quality on a particular link at a minimum transmit power level. A simple, quantifiable, measure of the speech quality on a link is the associated frame error rate (FER) on that link. For CDMA systems based on IS-95, the desired speech quality can be said to have been achieved on a link if the FER is at or below a certain level (e.g., 1%). For a given fading environment, the FER is a function of the average $E_b/N_0$ at the receiver. Since, as described above, inner loop power control helps maintain the receiver $E_b/N_0$ close to the target $E_{bT}/N_{0T}$, the FER is, ultimately, determined by the target $E_{bT}/N_{0T}$. Therefore, to achieve the desired speech quality in a given fading environment, the target $E_{bT}/N_{0T}$ needs to be set at a level which is appropriate for that environment.

Unfortunately, there is no fixed $E_{bT}/N_{0T}$ target that achieves the desired FER in all fading environments. Therefore, those in the art have developed an adaptive mechanism that adjusts the target $E_{bT}/N_{0T}$ accordingly. This mechanism, referred to hereafter as "Reverse Outer Loop Power Control" (ROLPC) monitors the FER and changes the target $E_{bT}/N_{0T}$ depending on whether the FER is below, or above, a desired threshold. By directly using the FER to drive the target $E_{bT}/N_{0T}$, the current ROLPC achieves its objective very well in reasonably steady fading environment. However, since the FER monitoring process implicit in this technique is rather slow (with time constants of the order of a couple of seconds), its performance can deteriorate in a dynamic environment with rapidly changing fading characteristics.

As such, in order to improve the speed of the ROLPC, the commonly assigned U.S. patent application of Carl Weaver and Wei Peng, entitled "Symbol Error Based Power Control For Mobile Telecommunication System," Ser. No. 08/346,800, filed Nov. 30, 1994, now U.S. Pat. No. 5,727,033, describes a symbol error (SE) based technique which potentially improves the performance of ROLPC in a dynamic fading environment. This Fixed SE rate (SER) target ROLPC technique, which is based on the premise that the SER and FER are strongly correlated, tries to maintain the SER close to a pre-determined fixed target SER value. Thus, after every frame the associated symbol error count is compared with the target SER and the $E_{bT}/N_{0T}$ target is raised or lowered depending upon whether the symbol error count was above or below the SER target. The updated $E_{bT}/N_{0T}$ target is used to generate inner loop feedback bits during the next frame.

SUMMARY OF THE INVENTION

The above-mentioned Fixed SER target ROLPC technique uses a fixed SER target for the mean value of the SE count (SEC). Notwithstanding the performance improvements possible with the above-mentioned Fixed SER target ROLPC technique, I have observed that this technique cannot maintain the FER close to the target in different fading environments because the relationship between the SER and FER varies across different cellular communications environments.

However, I have also discovered an alternative non-adaptive symbol error count based reverse link outer loop power control technique that also achieves the desired FER under a variety of fading environments. In particular, and in accordance with the invention, a target is set for a second order statistic of the SE count. As a result, the inventive concept provides a non-adaptive SE count based ROLPC technique that achieves desired FER under different fading conditions.

In an embodiment of the invention, a base station sets a fixed target for the standard deviation of the SE count as a function of a target FER. In particular, the base station monitors a symbol error count of a received signal (transmitted from a mobile station). This symbol error count is used to update an estimate of the standard deviation of the SE count. This estimate of the standard deviation of the SE count is compared with a target standard deviation of the SE count to make changes in the $E_{bT}/N_{0T}$ target. The adjusted $E_{bT}/N_{0T}$ target is used to provide power control.

As a result, the inventive concept provides a technique to control FER in a variety of cellular communications environments and, at the same time, keep the performance benefits of a SER based technique.

DETAILED DESCRIPTION

Figure 1:
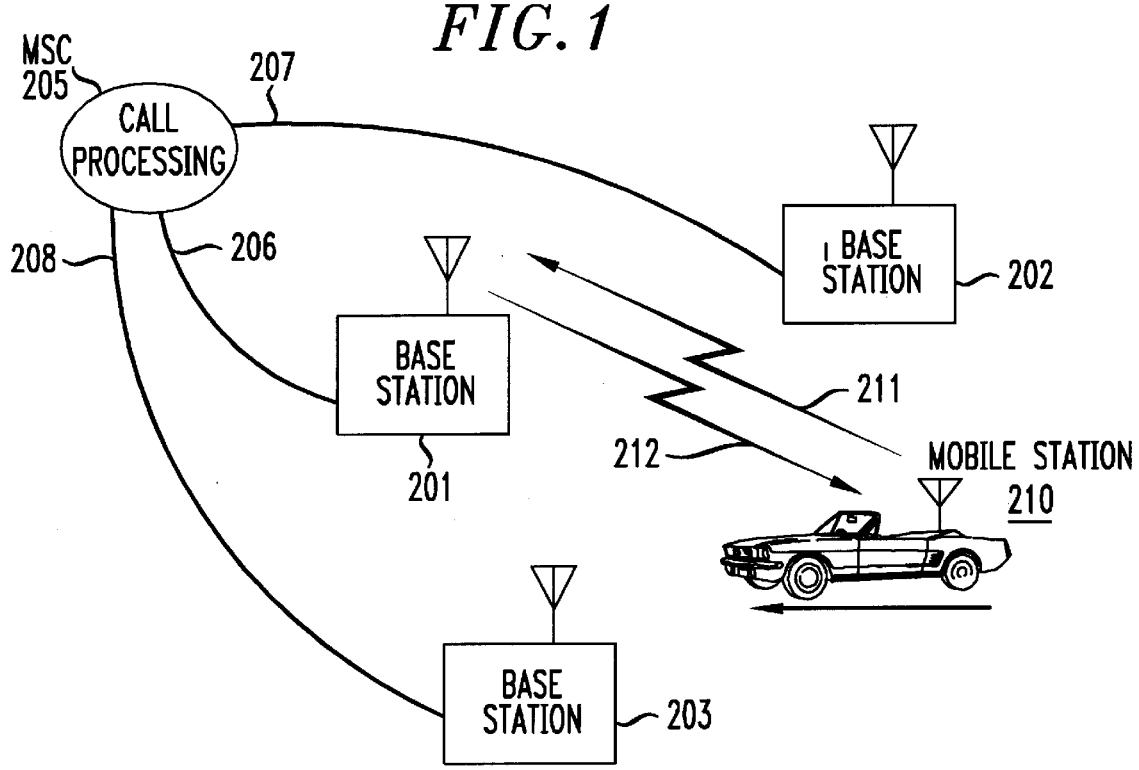
FIG. 1 shows a portion of a mobile communications system embodying the principles of the invention.

Before describing the inventive concept, a short description of the above-mentioned prior art Fixed SER target ROLPC technique is provided. Following this section, the inventive concept is presented.

Prior Art Fixed SER Target ROLPC

The core of this technique, assuming only full rate frames have been received and that no erasures have occurred, is described below. (It should be noted that dealing with partial rate frames and frame erasures leading to the loss of the rate estimate can be done in a number of ways. For example, partial rate frames could use smaller step sizes for making changes in the $E_{bT}/N_{OT}$ target, and, if the rate information is unavailable because of a frame erasure, the last available rate parameter may be used as an estimate for the current frame rate.)

The following definitions are used:

$T_{SE}$=fixed SER target;

$(T_{E_{bT}/N_{OT}})_n$=the $E_{bT}/N_{OT}$ target (in dB) for the $n^{th}$ frame;

$\Delta$=the basic full rate step size, also in units of dB;

$A_0=0, A_1, \ldots, A_{K-1}$ and $A_K=\infty$ are a strictly increasing sequence of integers;

$M_1, M_2, \ldots, M_K$ are another sequence of strictly increasing positive weight values;

$SE_n$=the symbol error count generated by the $n^{th}$ frame, which is provided by the receiver portion of the base station;

$E_{max}$=Upper limit on the $E_{bT}/N_{OT}$ target (in dB);

$E_{min}$=Lower limit on the $E_{bT}/N_{OT}$ target (in dB); and $d_n$, $L_n$, are variables, or parameters.

The Fixed SER target ROLPC technique adjusts the $E_{bT}/N_{OT}$ target in the following manner:

$$d_n = SE_n - T_{SE}; \quad (1)$$

$$sgn(d_n) = \text{Sign of } d_n; \quad (2)$$

$$\text{if } d_n = 0 \text{ then let } L_n = 0; \quad (3)$$

$$\text{Else if } A_{k-1} < |d_n| \leq A_k \text{ for some } k > 0, \text{ Let } L_n = M_k; \quad (4)$$

$$(T_{E_{bT}/N_{OT}})_{n+1} = (T_{E_{bT}/N_{OT}})_n + sgn(d_n)L_n\Delta; \quad (5)$$

$$\text{if } (T_{E_{bT}/N_{OT}})_{n+1} > E_{max}, (T_{E_{bT}/N_{OT}})_{n+1} = E_{max}; \text{ and} \quad (6)$$

$$\text{if } (T_{E_{bT}/N_{OT}})_{n+1} < E_{min}, (T_{E_{bT}/N_{OT}})_{n+1} = E_{min}. \quad (7)$$

In step (1) of the above technique, initially the variable, $d_n$, is set equal to the difference between the symbol error count generated by the $n^{th}$ frame, $SE_n$, and the target symbol error rate for the $n^{th}$ frame, $T_{SE}$. In step (2), the function $sgn(d_n)$ is set equal to the sign of the variable, $d_n$. In step (3), if the value of the variable, $d_n$, is equal to zero, then the variable, $L_n$, is also set equal to zero and execution proceeds to step (5), described below. However, if the value of the variable, $d_n$, is not equal to zero, then the magnitude of the variable $d_n$ is compared to a plurality of intervals, $A_k$, in step (4). The parameters $A_0=0, A_1, \ldots, A_{K-1}$ and $A_K=\infty$, define intervals such that if the magnitude of the difference between the actual symbol error count $SE_n$ and the target $T_{SE}$ falls in the, say, $k^{th}$ interval, the variable $L_n$ is set equal to the corresponding weight $M_k$ (illustrative values for these variables are given below). In step (5), the $E_{bT}/N_{OT}$ target is updated for the next frame, n+1, by adjusting the current $E_{bT}/N_{OT}$ target by the basic step size $\Delta$ multiplied, as shown, by the value of the variable $L_n$. This allows one to make large or small changes in the $E_{bT}/N_{OT}$ target depending on the magnitude of the difference between the actual symbol error count and the symbol error target. In steps (6) and (7), the $E_{bT}/N_{OT}$ target for the next frame is limited by the respective upper and lower limit values.

SE Count Based ROLPC with a Constant Target for a Second Order Statistic of the SE Count I have observed that, at least in the range where the FER target varied between 1% and 3%, there was an almost deterministic relationship between the standard deviation of the SE count and the mean FER that seemed to hold across different fading environments. In other words, and in accordance with the inventive concept, if one controls a second order statistic, e.g., the standard deviation, of the SE count one controls the FER. As a result, the inventive concept provides a non-adaptive SE count based ROLPC technique that achieves desired FER under different fading conditions.

Turning now to FIG. 1, a portion of a CDMA mobile communications system 200 embodying the principles of the invention is shown. Other than the inventive concept, the elements shown in FIG. 1 are well-known and will not be described in detail. For example, although shown as a single block element, base station 201 includes stored-program-control processors, memory, and appropriate interface cards. Except as noted below, it is assumed that the CDMA mobile communications system conforms to industry standard IS-95. Portion 200 comprises mobile switching center (MSC 205), which (among other things) provides call processing; three base stations. 201, 202, and 203; and a mobile station 210, which is illustratively represented by a vehicle icon. The three base stations and the mobile station are representative of wireless endpoints. Each base station is coupled to MSC 205 over respective land-line facilities, 206, 207, and 208. For the purposes of the remainder of this description, it is assumed that mobile station 210 is in communications with base station 201, via downlink signal 212 and uplink signal 211.

Figure 2:
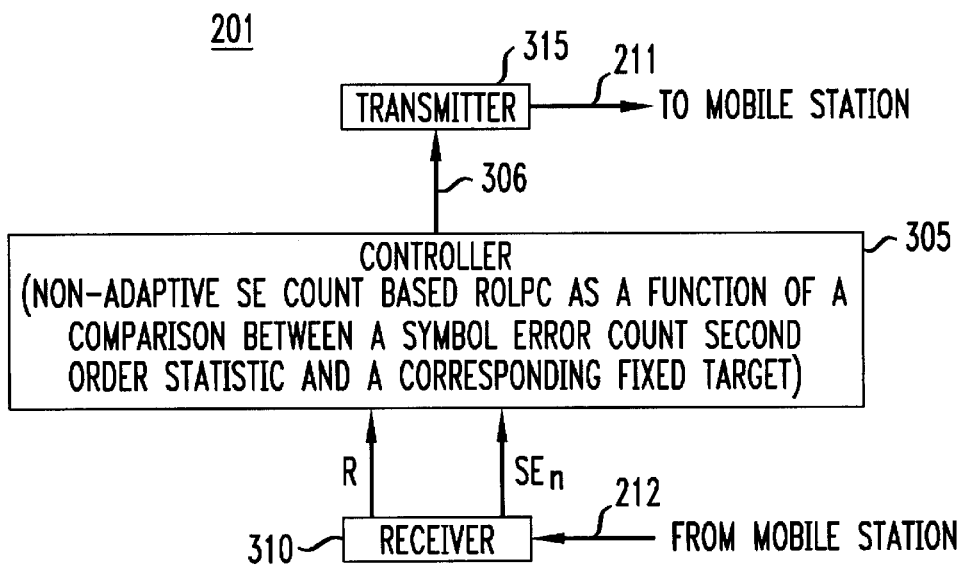
FIG. 2 shows a portion of a base station embodying the principles of the invention.

In accordance with the inventive concept, base station 201 performs the inventive technique (described in detail below) on the received signal 211 from mobile station 210. FIG. 2 shows a portion of base station 201 embodying the principles of the invention. Other than the inventive concept, the elements shown in FIG. 2 are well-known and will not be described in detail. For example, controller 305 is representative of a stored-program-controlled processor with associated memory as known in the art. Also, only that portion of base station 201 related to the inventive concept is shown, e.g., other processing by receiver 310 of the received signal is not described. Base station 201 comprises controller 305 (also referred to herein the base station processor), receiver 310, and transmitter 315. Reference should now also be made to FIG. 3, which shows an illustrative high-level flow chart embodying the principles of the invention. It is assumed that only full rate frames are transmitted and that the rate information is not lost. (As mentioned above, partial rate frames and frame erasures can be handled in a number of ways. For example, partial rate frames could use smaller step sizes for making changes in the $E_{bT}/N_{OT}$ target, and, if the rate information is unavailable because of a frame erasure, the last available rate parameter may be used as an estimate for the current frame rate.)

Figure 3:
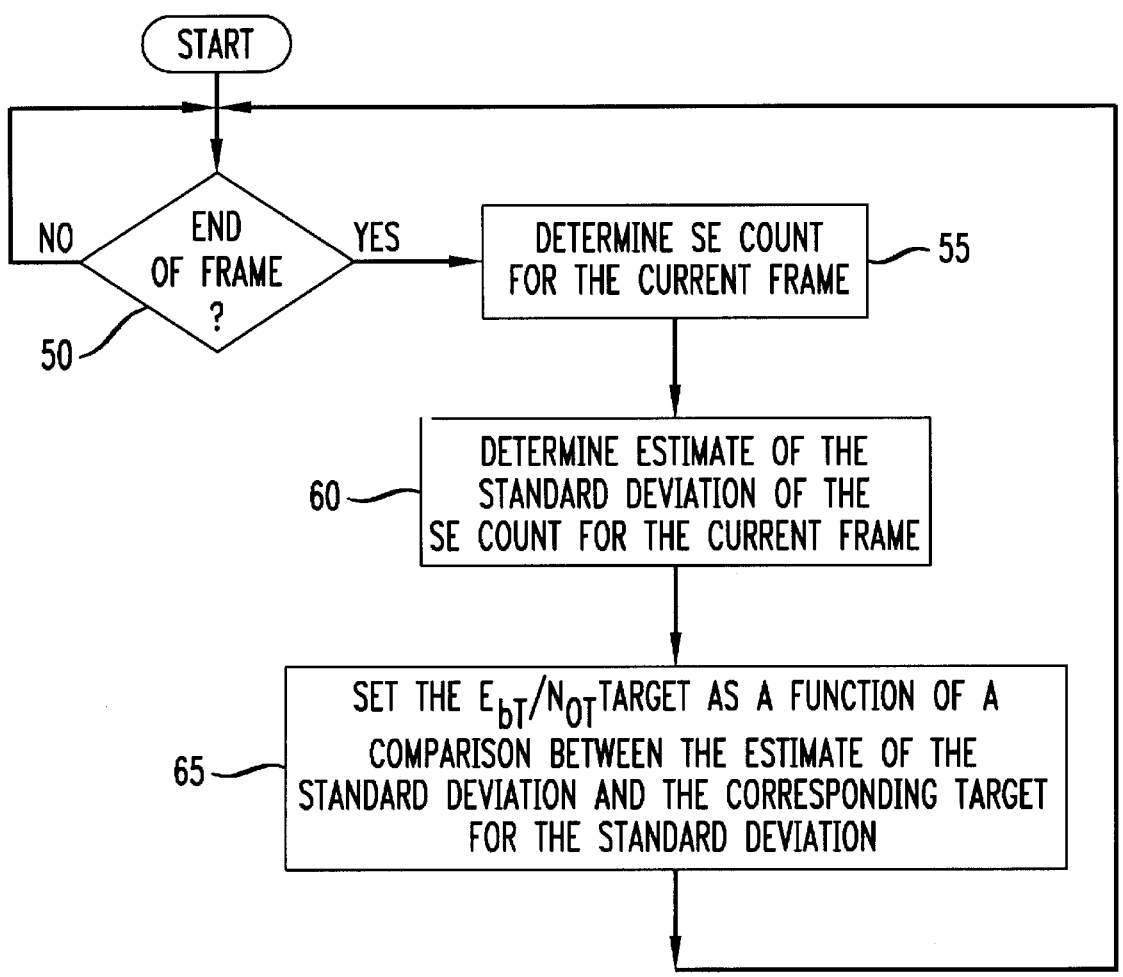
FIG. 3 shows an illustrative flow chart embodying the principles of the invention.

In step 50, of FIG. 3, controller 305 waits for the end of every $n^{th}$ frame. At the end of every frame, the resulting symbol error count, $SE_n$, is determined in step 55, of FIG. 3, by receiver 310 of FIG. 2. In particular, receiver 310 receives the uplink signal, 211, and provides to controller 305 two signals: R (described below), which is the reciprocal of the rate of the frame just processed by receiver 310 and is equal to 0 if there is an erasure so that the rate information is lost; and $SE_n$, which is the symbol error count generated by the $n^{th}$ frame. In accordance with the inventive concept, controller 305 sets a fixed target for the standard deviation of the symbol error count as a function of a target FER. In step 60, of FIG. 3, controller 305 forms an estimate of the standard deviation of the symbol error count. To compute the estimate of the standard deviation of the symbol error count, controller 305 monitors the symbol count $SE_n$, provided by receiver 310, and updates values for the following additional variables:

$\overline{SER}_n$=estimated average symbol error count after the $n^{th}$ frame is received; and $\overline{SER^2}_n$=estimated average square of the symbol error count after the $n^{th}$ frame is received.

These values are updated using simple, single pole IIR (infinite impulse response) filters (described below). (It is possible to use other filtering algorithms to update these estimates.) In step 65, controller 305 updates the $E_{bT}/N_{OT}$ target as a function of a comparison between the estimate of the standard deviation and the corresponding target for the standard deviation. The adjusted $E_{bT}/N_{OT}$ target is used to provide power control. Controller 305 also controls transmitter 315 for providing the above-mentioned feedback signal to mobile station 210 for controlling the transmit signal level of mobile station 210. (As noted earlier, when the mobile station receives this feedback signal, the mobile station raises its transmit power by 1 dB or lowers it by 1 dB depending on the value of the feedback bit.)

An illustrative detailed description of the inventive technique is now presented. The following definitions are used (some of these definitions are similar to those used in the above-described prior art Fixed SER target ROLPC technique and are repeated here for convenience):

$E_{max}$=Upper limit on the $E_{bT}/N_{OT}$ target (in dB);
$E_{min}$=Lower limit on the $E_{bT}/N_{OT}$ target (in dB);
FER_target=Desired frame error rate;
$E_{nom}$=Nominal value of the $E_{bT}/N_{OT}$ target (in dB);
$T_{SE}$(FER_target)=The target for symbol error count standard deviation as a function of FER_target;
$A_0, A_1, \ldots, A_K$: K+1 integers arranged in an ascending order (to define symbol error intervals) with $A_0$=0, and $A_K=\infty$;
$M_1, M_2, \ldots, M_K$: K positive weight values arranged in an ascending order;
$\beta_1, \beta_2, \beta_4, \beta_8$: De-emphasis factors for frame rates 1, ½, ¼ and ⅛ respectively, with $\beta_1$=1;
$\Delta$: Basic step size (in dB) for changes in the $E_{bT}/N_{OT}$ target;

$\delta_1, \delta_2, \delta_4, \delta_8$: Step sizes (in dB) in case of frame erasures when the last good frame rate is 1, ½, ¼ and ⅛, respectively;
$\alpha$: IIR filter constant;
$S_{nom}$=Nominal value of the SER;
$CV_{nom}$=Nominal value of the coefficient of variation of the SE count;
$\overline{SER}_n$=estimated average SE count after the $n^{th}$ frame;
$\overline{SER^2}_n$=estimated average square of SE count after the $n^{th}$ frame; and
$(T_{E_{bT}/N_{OT}})_n$=the $E_{bT}/N_{OT}$ target (in dB) for the $n^{th}$ frame;
Last_good_rate=The speech rate of the last frame received without an erasure;
d, L, $\sigma_{SER}$, are variables, or parameters;

The following signal values are supplied by the receiver of the base station:

$R_n$=The reciprocal of the rate of the frame just processed and is equal to 0 if there is an erasure so that the rate information is lost; and $SE_n$=the symbol error count generated by the $n^{th}$ frame.

The following initialization is performed:

$T_{Eb/N0} = E_{nom}$;

$\overline{SER^2}_n = S_{nom}$;

$\overline{SER^2}_n = (S_{nom})^2(1+CV^2_{nom})$; and

Last_good_rate=1.

In accordance with the inventive concept, the base station processor carries out the computations shown below to update the $E_{bT}/N_{OT}$ target after the base station receiver has just finished processing a frame (and provided current values for R and $SE_n$). It should be noted that for simplicity, the subscript n, representing the nth frame has been dropped from some of the variables, e.g., the variable $SE_n$ is shown as SE.

If $R > 0$; (100)

{

$SE \leftarrow SE \times R$; (101)

$\overline{SER} \leftarrow (1 - \alpha/\beta_R)\ \overline{SER} + (\alpha/\beta_R)SE$; (102)

$\overline{SER^2} \leftarrow (1 - \alpha/\beta_R)\ \overline{SER^2} + (\alpha/\beta_R)SE^2$; (103)

$\sigma_{SE} = \sqrt{\overline{SER^2} - (\overline{SER})^2}$ (104)

$d = \sigma_{SE} - T_{SE}(FER\_target)$; (105)

$sgn(d)$ = sign of $d$; (106)

If $d = 0$, let $L = 0$; (107)

Else {find $k$ such that $A_{k-1} < |d| \leq A_k$, let $L = M_k$;} (108)

$T_{E_b/N_0} \leftarrow T_{E_b/N_0} + sgn(d_n)L_n\Delta/\beta_R$; (109)

Last_good_rate = R; (110)

}

Else (i.e., if R equals 0 because of frame erasure)

{

R = Last_good_rate; (111)

-continued $$T_{E_b/N_0} \leftarrow T_{E_b/N_0} + \delta_R \quad (112)$$
}

In step (100) of the above technique, the value of R, received from the base station receiver, is evaluated. A value of R greater than zero is representative of no erasure of the current received frame, while a value of R equal to zero indicates an erasure has occurred. If the value of R is equal to zero, then steps (111) and (112) are performed. In this case, the value of R is set equal to the value of the variable Last_good_rate in step (111). In step (112), the value of the $E_{bT}/N_{0T}$ target is updated for the next frame, n+1, by adjusting the current $E_{bT}/N_{0T}$ target by $\delta_R$ (as noted above, these are $\delta_1$, $\delta_2$, $\delta_4$, $\delta_8$, where R is either 1, 2, 4, or 8). Execution proceeds with step (113), described below. However, if at step (100) the value of R is greater than zero, steps (101) through (110) are performed.

In step (101), the symbol error count SE for the current frame is multiplied by the value of R to provide an adjusted value for the symbol error count SE. Steps (102) and (103) update the above-described monitored variables. In step (104), the estimate of the variance of the SE count, $\sigma_{SE}$, is determined. In step (105), the variable, d, is set equal to the difference between the value of $\sigma_{SE}$ and the target of the standard deviation of the symbol error count, $T_{SE}$(FER_target). In step (106), the function sgn(d) is set equal to the sign of the variable, d. In step (107), if the value of the variable, d, is equal to zero, then the variable, L, is also set equal to zero and execution proceeds to step (109), described below. However, if the value of the variable, d, is not equal to zero, then the magnitude of the variable d is compared to a plurality of intervals, $A_k$, in step (108). The parameters $A_0=0$, $A_1$, ..., $A_{K-1}$ and $A_K=\infty$, define intervals such that if the magnitude of the difference between the estimated variance and the target variance falls in the, say, $k^{th}$ interval, the variable L is set equal to the corresponding weight $M_k$. In step (109), the $E_{bT}/N_{0T}$ target is updated for the next frame, n+1, by adjusting the current $E_{bT}/N_{0T}$ target by the basic step size $\Delta$ multiplied, as shown, by the value of the variables L and divided by the value of the de-emphasis factor $\beta_R$ (as noted above, these are $\beta_1$, $\beta_2$, $\beta_4$, $\beta_8$, where R is either 1, 2, 4, or 8). In step (110), the value of the variable Last_good_rate is set equal to the value of R.

In steps (113) and (114), the $E_{bT}/N_{0T}$ target for the next frame is limited by the respective upper and lower limit values.

Performance of SE Count Based ROLPC with a Constant Target for a Second Order Statistic of the SE Count Simulation results are presented to show how effectively the SE count based ROLPC with a Constant Target for a Second Order Statistic of the SE count performs in different environments. Again, it should be noted that in these simulations full rate frames alone are used and that it is assumed that the rate information is never lost because of erasures. The parameters used in the simulation runs were as follows:

$E_{max}$=Upper limit on the $E_{bT}/N_{0T}$ target (in dB), e.g., 10.5 dB;

$E_{min}$=Lower limit on the $E_{bT}/N_{0T}$ target (in dB), e.g., 3 dB;

FER_target=Desired frame error rate, e.g., 1%;

$E_{nom}$=Nominal value of the $E_{bT}/N_{0T}$ target (in dB), e.g., 6 dB;

$T_{SE}$(FER_target)=The target for the standard deviation of the symbol error count was varied to obtain the relationship between the value of this target and the FER under different fading conditions; e.g., $T_{SE}(1)$=10;

$A_0$=0, $A_1$=3, $A_2$=5, and $A_3$=∞;

$M_1$=1, $M_2$=2, and $M_3$=4;

$\beta_1$, $\beta_2$, $\beta_4$, $\beta_8$: De-emphasis factors for frame rates 1, ½, ¼ and ⅛ respectively, with $\beta_1$=1;

$\Delta$: Basic step size (in dB) for changes in the $E_{bT}/N_{0T}$ target, e.g., 0.1 dB;

$\delta_1$, $\delta_2$, $\delta_4$, $\delta_8$: Step sizes (in dB) in case of frame erasures when the last good frame rate is 1, ½, ¼ and ⅛, respectively;

$\alpha$: IIR filter constant, e.g., 0.2;

$S_{nom}$=Nominal value of the SER target, e.g., 15;

$CV_{nom}$=Nominal value of the coefficient of variation of the symbol error count, e.g., 0.8;

The simulation incorporated the following list of assumptions.

The base-station receiver was assumed to be connected to two antennas, each receiving one multipath of the reverse link transmissions, with a RAKE receiver finger, as known in the art, locked to each multipath.

The fading on the two multipaths was assumed to be independent with Rayleigh distribution. Jakes' construction (e.g., see Jakes, W. C., *Microwave Mobile Communications*, Wiley, New York, 1974) was used to generate this fading phenomenon with its speed dependent correlation properties.

All other interference, thermal noise, etc. was modeled as an independent white Gaussian noise process.

A bit (coded symbol) level simulation of the Viterbi decoder/interleaver combination in which the soft decision metrics were generated according to the logic described in Chapter 4 of "*CDMA Principles of Spread Spectrum Communications,*" by A. J. Viterbi, was incorporated into the overall simulation testbed.

Inner loop control was explicitly modeled—the $E_b/N_0$ estimator used in the inner loop was assumed to be perfect. A 5% error rate was assumed on the inner loop feedback bits. The $E_b/N_0$ estimator was assumed to compute the average per antenna $E_b/N_0$ by summing the instantaneous $E_b/N_0$ values for each active RAKE finger and then dividing the sum by 2 in the linear—not dB—domain.

Different fading conditions were created by varying the mobile speed from 3 MPH to 60 MPH. In addition, the AWGN environment was also included in this study for the sake of completeness. The value of the target for symbol error count standard deviation was varied from 10 to 20 to study the impact of this parameter.

Figure 4:
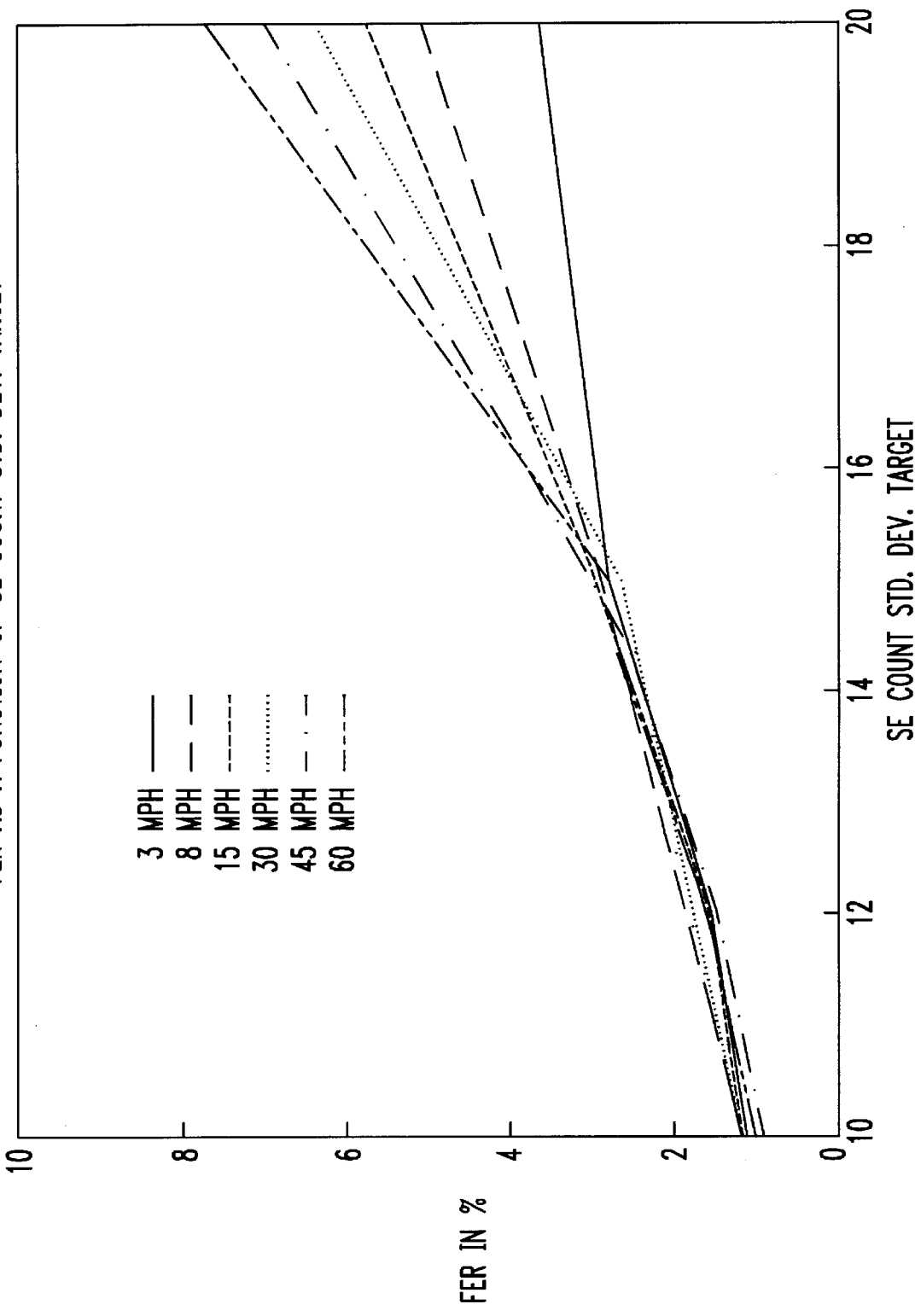
FIGS. 4 and 5 show simulation results for an illustrative technique embodying the principles of the invention.
Figure 5:
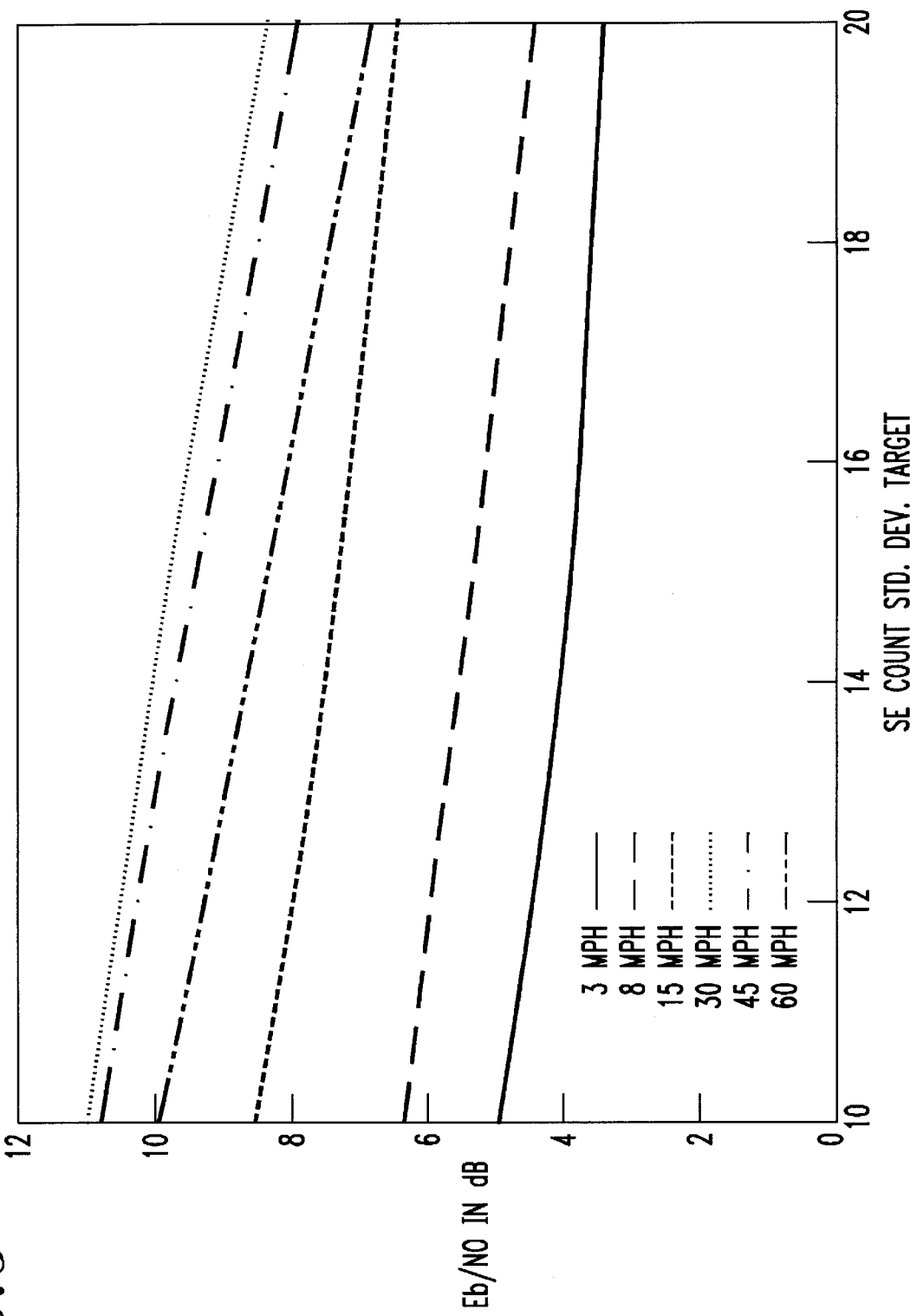

FIGS. 4 and 5 respectively show the frame error rate and the average value of the $E_b/N_0$ at the base station receiver as a function of the target for SER standard deviation. FIG. 4 is particularly revealing. It shows that at least in the range where the FER target is between 1 and 3 percent, the illustrative non-adaptive algorithm of the inventive concept can successfully maintain the frame error rate close to the target frame error rate under all of the environments considered if the target for symbol error count standard deviation is set appropriately. Note, in FIG. 5, that the corresponding $E_b/N_0$ levels (for a given FER) vary substantially depending upon the underlying fading environment. As such, it may be safely concluded that this technique is capable of maintaining the frame error rate close to the desired FER under the typical fading conditions one is likely to encounter in the field.

Other variations are also possible. For example, in the example above, it was assumed that the mobile station is communicating with a single base station. However, when the mobile station is in soft-handoff (communicating with multiple base stations), the symbol error count based control described herein may be performed within MSC 205. In particular, MSC 205 receives received frame information (including symbol error count) from each base station involved in soft-handoff with the mobile station. As known in the art, MSC 205 comprises a frame handler (not shown). The frame handler selects the received frame that has the best quality according to some predetermined criterion. (As just one simple example, the frame with the lowest symbol error count. However, other criteria can be used.) MSC 205 then performs the above-described SE count based ROLPC with a Constant Target for a Second Order Statistic of the SE count and transmits the results back to the base stations. As yet another alternative, each base station can perform its own SE count based control, in accordance with the principles of the invention, using their respective received frames.

As already noted above, the foregoing merely illustrates the principles of the invention and it will thus be appreciated that those skilled in the art will be able to devise numerous alternative arrangements which, although not explicitly described herein, embody the principles of the invention and are within its spirit and scope. For example, although the inventive concept was illustrated herein as being implemented with discrete functional building blocks, e.g., a controller, etc., the functions of any one or more of those building blocks can be carried out using one or more appropriately programmed processors, e.g., a digital signal processor; discrete circuit elements; integrated circuits; etc. In addition, the inventive concept is applicable to other cellular access schemes besides IS-95, power control of other signals received by the base station, and power control by the mobile station of signals received from the base station.

What is claimed:

1. A method for use in a cellular infrastructure, the method comprising the steps of:

receiving a signal from a mobile station; and responsive to the received signal, performing symbol error count based reverse outer loop power control with a fixed target for a second order statistic of the symbol error count.

2. The method of claim 1 wherein the second order statistic is a standard deviation and the performing step includes the steps of:

monitoring a symbol error count of the received signal for determining a standard deviation of the symbol error count; and adjusting a target signal-to-noise ratio for the received signal as a function of a comparison between the standard deviation of the symbol error count and the fixed target for use in providing the power control.

3. The method of claim 1 wherein the performing step includes the steps of:

monitoring a symbol error count of the received signal for determining the second order statistic of the symbol error count; and adjusting a target signal-to-noise ratio for the received signal as a function of a comparison between the second order statistic and the fixed target for use in providing the power control.

4. The method of claim 5 wherein the power control is a symbol error count based power control and the second order statistic is a standard deviation.

5. A method for use in equipment for providing power control in a cellular system, the method comprising the steps of:

receiving a signal from a wireless endpoint;

developing a second order statistic from the received signal; and performing power control with the wireless endpoint as a function of the second order statistic by comparing a value of the second order statistic with a target value of the second order statistic.

6. The method of claim 5 wherein the developing step include the step of monitoring a symbol error count of the received signal for determining an estimate of a standard deviation of the received symbol error count; and the performing step includes the step of adjusting a target signal-to-noise ratio for the received signal as a function of a comparison between the estimate of the standard deviation and a target value for the standard deviation.

7. The method of claim 5 wherein the equipment is a part of a base station of the cellular system.

8. A method for use in a cellular infrastructure, the method comprising the steps of:

receiving received frame information from a number of base stations, the frame information corresponding to signals received by those base stations, where the source of the signals is a mobile station;

selecting that received frame that meets a predetermined selection criteria; and performing symbol error count based reverse outer loop power control with a fixed target for a second order statistic of the symbol error count based on the selected frame for application to the mobile station.

9. The method of claim 8 wherein the second order statistic is a standard deviation and the performing step includes the steps of:

monitoring a symbol error count associated with the selected frame for determining a standard deviation of the symbol error count; and adjusting a target signal-to-noise ratio for the corresponding received signal as a function of a comparison between the standard deviation of the symbol error count and the fixed target for use in providing the power control.

10. The method of claim 8 wherein the performing step includes the steps of:

monitoring a symbol error count associated with the selected frame for determining the second order statistic of the symbol error count; and adjusting a target signal-to-noise ratio for the corresponding received signal as a function of a comparison between the second order statistic and the fixed target for use in providing the power control.

11. Apparatus for use in a cellular infrastructure, the apparatus comprising:

a receiver for receiving a signal from a mobile station; and a processor, responsive to the received signal, for performing symbol error count based reverse outer loop power control with a fixed target for a second order statistic of the symbol error count.

12. The apparatus of claim 11 wherein the second order statistic is a standard deviation and the processor monitors a symbol error count of the received signal for determining a standard deviation of the symbol error count; and adjusts a target signal-to-noise ratio for the received signal as a function of a comparison between the standard deviation of the symbol error count and the fixed target for use in providing the power control.

13. The apparatus of claim 12 further comprising a transmitter for transmitting the power control information to the mobile station.

14. The apparatus of claim 11 wherein the processor monitors a symbol error count of the received signal for determining the second order statistic of the symbol error count; and adjusts a target signal-to-noise ratio for the received signal as a function of a comparison between the second order statistic and the fixed target for use in providing the power control.

15. The apparatus of claim 14 further comprising a transmitter for transmitting the power control information to the mobile station.

16. Apparatus for use in equipment for providing power control in a cellular system, the apparatus comprising:

a receiver for receiving a signal from a wireless endpoint;

a controller for (a) developing a second order statistic from the received signal; and (b) performing power control with the wireless endpoint as a function of the second order statistic by comparing a value of the second order statistic with a target value of the second order statistic.

17. The apparatus of claim 16 wherein the power control is a symbol error count based power control and the second order statistic is a standard deviation.

18. The apparatus of claim 16 wherein the controller monitors a symbol error count of the received signal for determining an estimate of a standard deviation of the received symbol error count; and the performing step includes the step of adjusting a target signal-to-noise ratio for the received signal as a function of a comparison between the estimate of the standard deviation and a target value for the standard deviation.

19. The apparatus of claim 16 wherein the equipment is a part of a base station of the cellular system.

20. The apparatus of claim 16 further comprising a transmitter for transmitting power control information to the mobile station.

* * * * *